Nov. 17, 1942.   J. B. DYER   2,302,012
DOMESTIC APPLIANCE
Filed June 21, 1938   9 Sheets-Sheet 3

INVENTOR.
John B. Dyer,
BY Spencer Hardman & John
ATTORNEYS

Nov. 17, 1942.  J. B. DYER  2,302,012
DOMESTIC APPLIANCE
Filed June 21, 1938  9 Sheets-Sheet 4

INVENTOR.
John B. Dyer
BY Spencer Hardman & John
ATTORNEYS

Nov. 17, 1942.   J. B. DYER   2,302,012
DOMESTIC APPLIANCE
Filed June 21, 1938   9 Sheets-Sheet 5

John B. Dyer INVENTOR.
BY Spencer Hardman &c.
ATTORNEYS

Nov. 17, 1942.  J. B. DYER  2,302,012
DOMESTIC APPLIANCE
Filed June 21, 1938  9 Sheets-Sheet 6
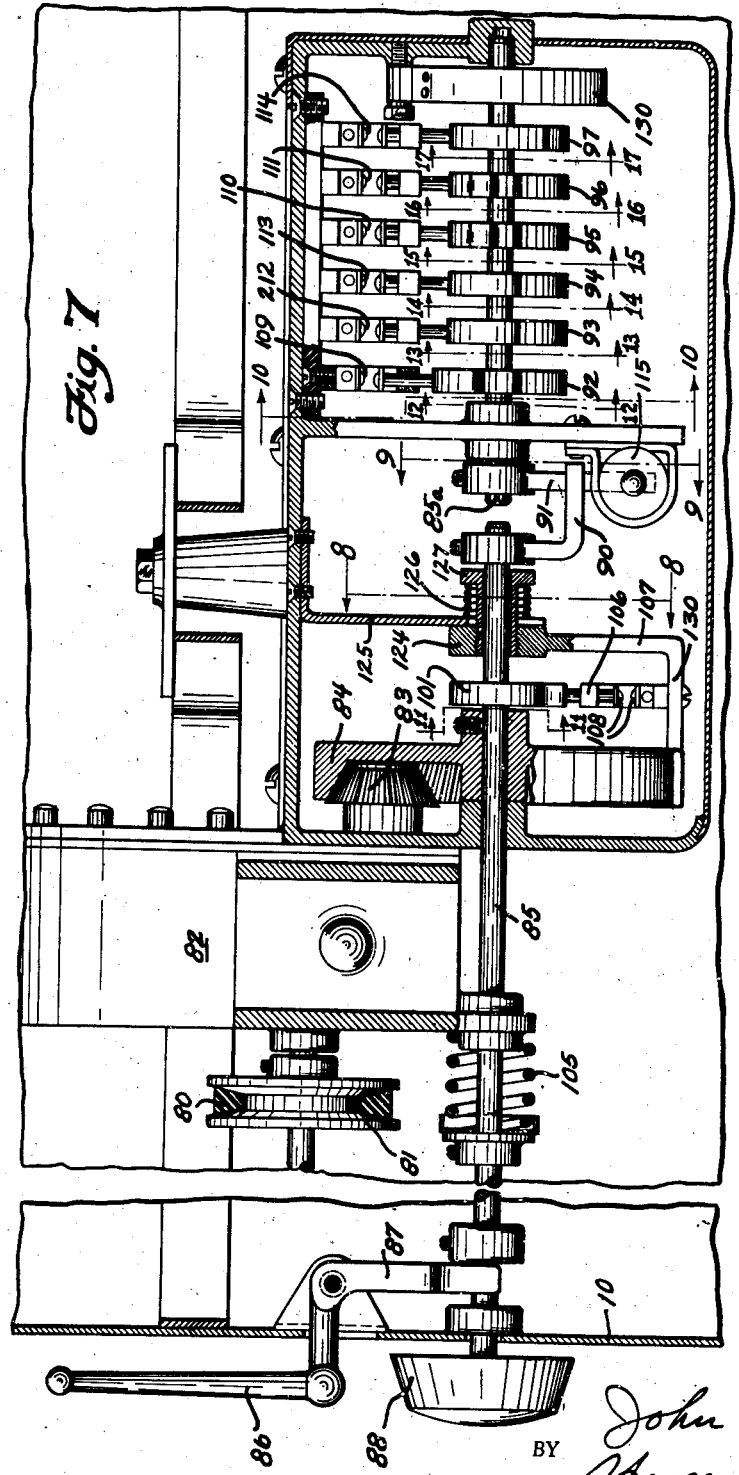
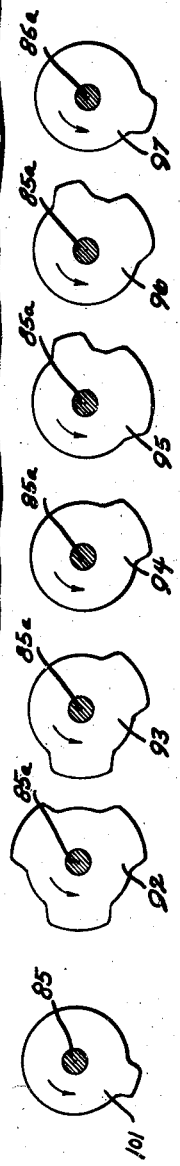
INVENTOR.
John B. Dyer
BY
Spencer Hardman & ...
ATTORNEYS Nov. 17, 1942.   J. B. DYER   2,302,012
DOMESTIC APPLIANCE
Filed June 21, 1938   9 Sheets-Sheet 7

INVENTOR.
John B. Dyer,
BY Spencer Hardman Tyler
ATTORNEYS

Nov. 17, 1942.  J. B. DYER  2,302,012
DOMESTIC APPLIANCE
Filed June 21, 1938  9 Sheets-Sheet 8

INVENTOR.
John B. Dyer,
BY
Spencer Hardman Jr.
ATTORNEYS

Nov. 17, 1942.    J. B. DYER    2,302,012
DOMESTIC APPLIANCE
Filed June 21, 1938    9 Sheets-Sheet 9

INVENTOR.
John B. Dyer
BY
Spencer Hardman & John
ATTORNEYS

Patented Nov. 17, 1942

2,302,012

UNITED STATES PATENT OFFICE 2,302,012

DOMESTIC APPLIANCE

John B. Dyer, Dayton, Ohio, assignor to General Motors Corporation, Dayton, Ohio, a corporation of Delaware Application June 21, 1938, Serial No. 214,962

5 Claims. (Cl. 68—23)

This invention relates to domestic appliances.

An object of this invention is to provide a washing machine having a single vertically rotatable and vertically oscillatable tub in which the clothes may be placed, and in which the various washing operations are performed automatically until the clothes have been washed, dried, rinsed, dried and further rinsed and dried the necessary number of times, all operations being performed without removing the clothes from the tub.

Another object of this invention is to provide a washing machine having a vertically rotatable and vertically oscillatable tub of improved construction.

Further objects and advantages of the present invention will be apparent from the following description, reference being had to the accompanying drawings, wherein a preferred form of the present invention is clearly shown.

In the drawings:

Fig. 7 is a cross-section of a control mechanism of the washing machine;

Figure 18:
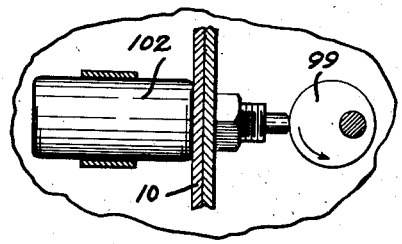
Figure 26:
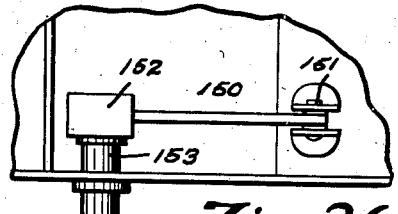
Figure 5:
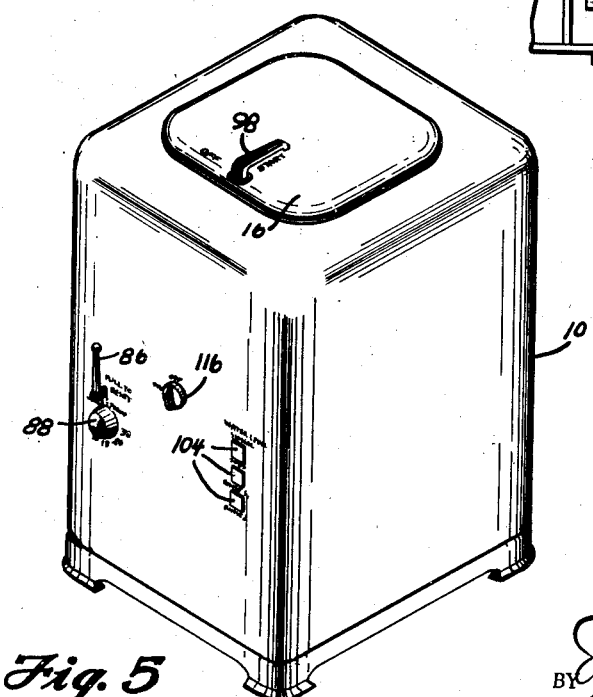
Fig. 5 is a view in perspective of the exterior of the washing machine.
Figure 19:
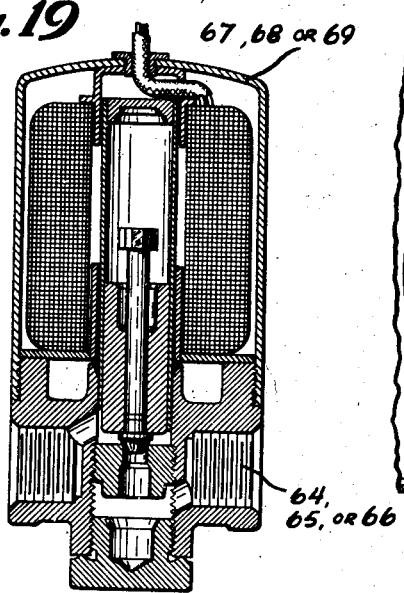
Figure 20:
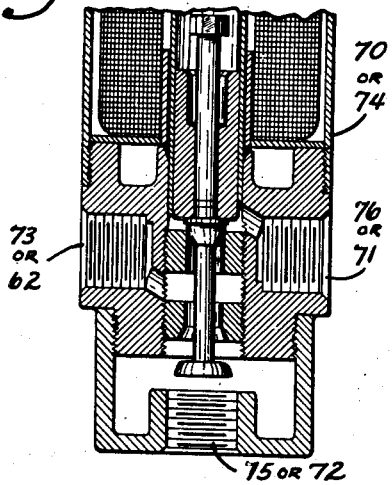
Figure 21:
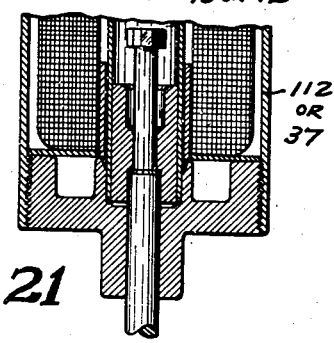
Figure 24:
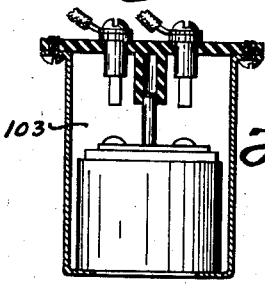
Figure 22:
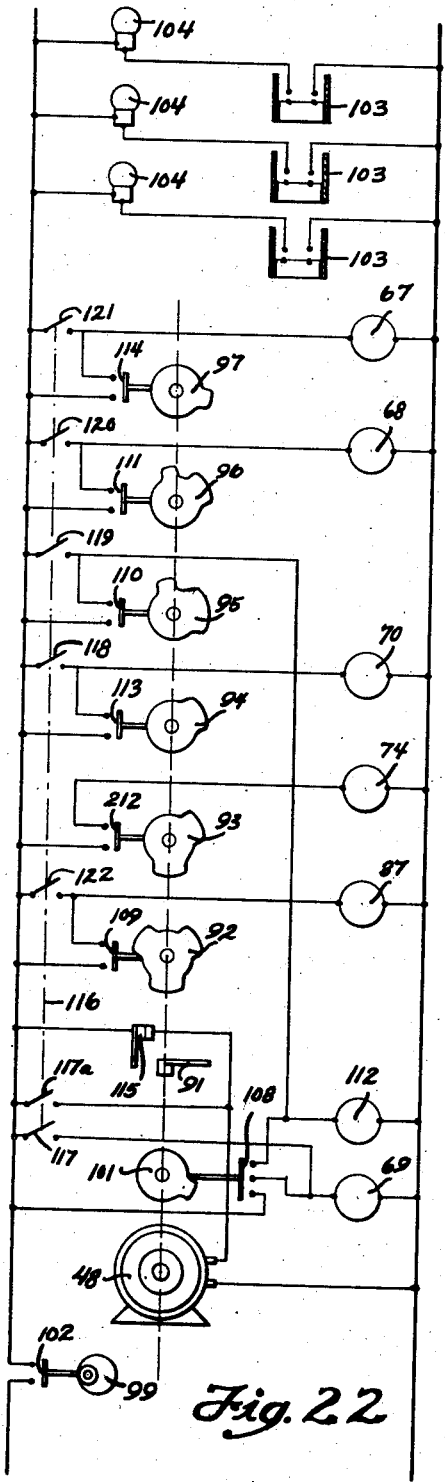
Figure 23:
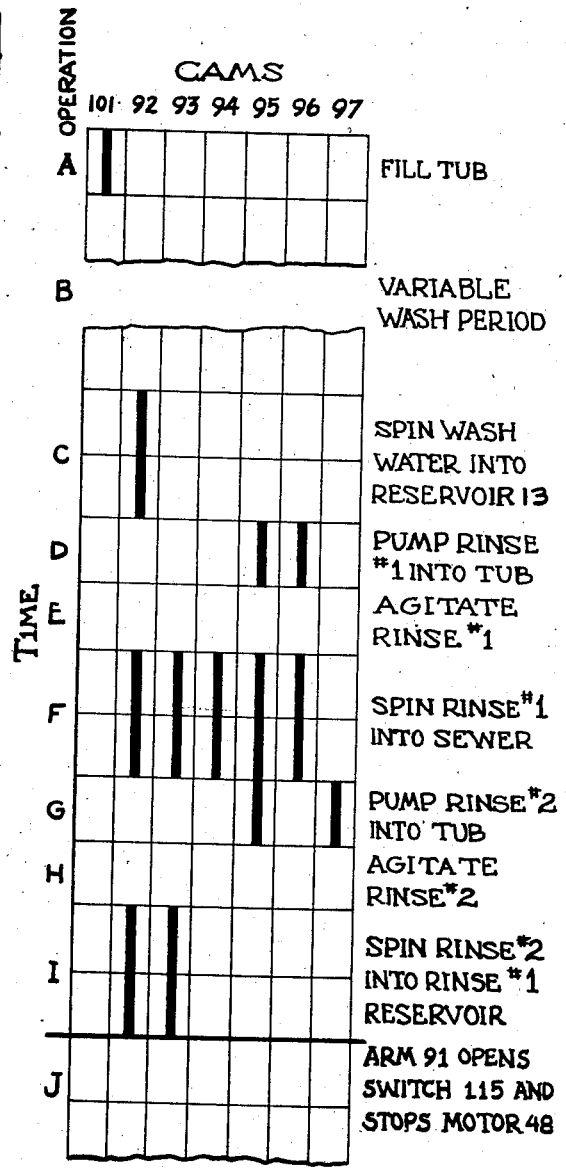
Figure 25:
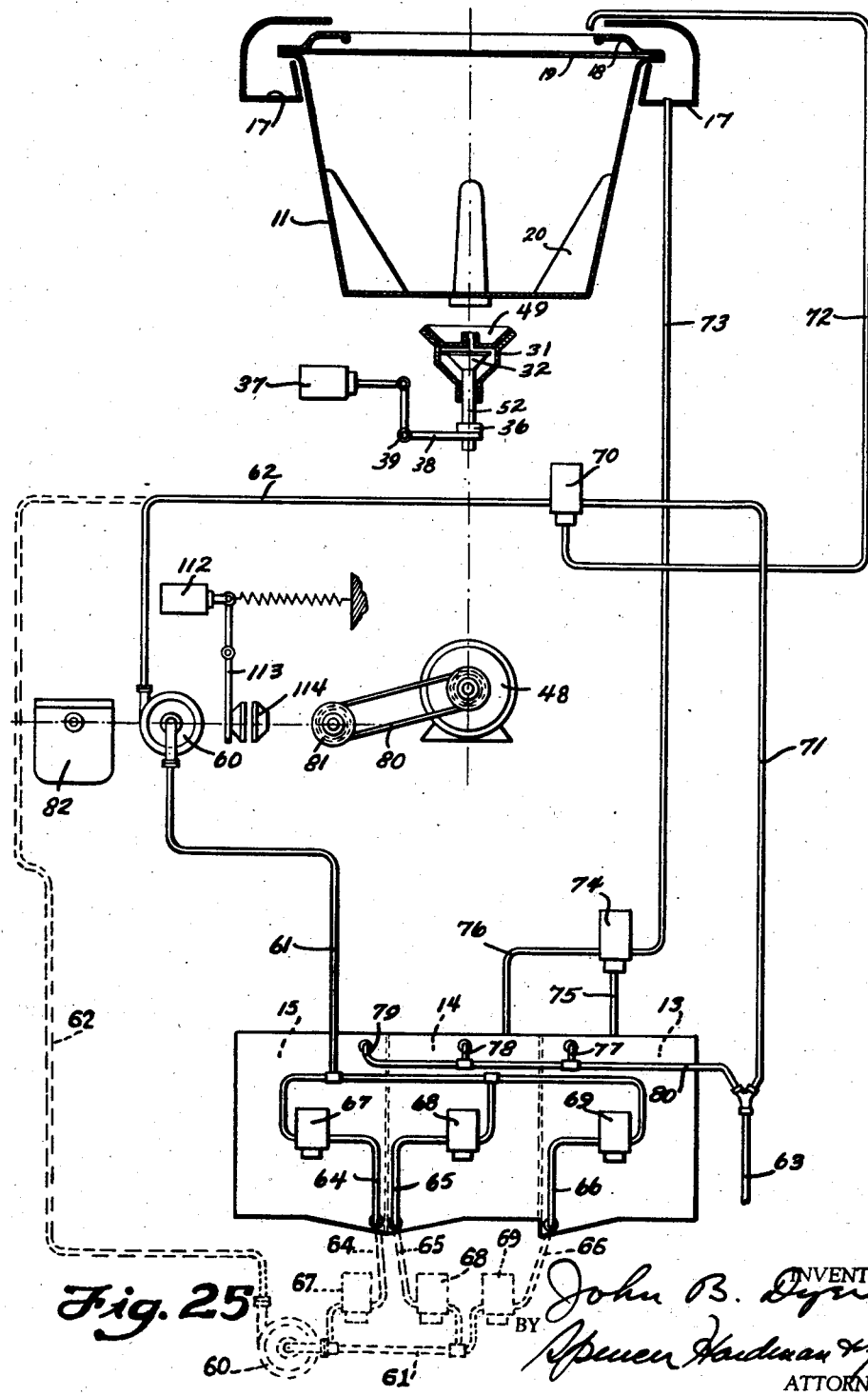

Figs. 11 to 17 inclusive are cross-sectional views taken along the lines 11 to 17 inclusive of Fig. 7;

Fig. 18 is a horizontal cross-sectional view of a portion of the machine taken underneath and adjacent the top and showing the control of an electrical switch by the cover handle locking cam;

Figs. 19, 20 and 21 are cross-sections of solenoid mechanisms which may be used with my invention;

Fig. 22 is a wiring diagram to indicate the connection between the controls and the devices being controlled;

Fig. 23 is a chart indicating the various operations in chronological order which are caused to be operated by the control mechanism;

Fig. 24 shows a float switch placed in each of the liquid reservoirs to control the water level signals;

Fig. 25 is a diagrammatic drawing to show the liquid flow connections and controls; and Fig. 26 is a view showing a float valve control for the intakes of the pump for use when emptying all of the reservoirs.

My improved washing machine preferably comprises an outer casing 10, in which is mounted a vertically rotatable and vertically oscillatable tub 11, a rotating and oscillating mechanism 12 therefor, and, if desired; solution and water containing reservoirs 13, 14 and 15, which may contain at various times washing liquids, such as a washing solution, and the proper number of rinses. In addition, the washing machine includes automatic or manual controls, hereinafter to be more fully described, for causing the tub to be rotated or oscillated at the proper time, and the proper liquids to be introduced into the tub, to be later drained during the drying operations to the proper receptacles, so that certain of the liquids can be used in washing subsequent batches of clothes.

The casing 10 includes a cover 16, and a drain trough 17. The drain trough 17 is provided with suitable drain pipes, hereinafter more fully described, which are provided with controls for directing the extracted liquid to the proper reservoir or to the sewer.

The tub 11 preferably includes an inwardly directed rim 18, which is slightly spaced from the main body of the tub, to provide a discharge opening, or openings, at 19. The tub 11 is provided with vertically disposed baffles 20, which agitate the clothes. The tub is mounted on a rotatable and oscillatable shaft 21, which is provided with a universal joint 22 at its upper end and with a universal joint 23 at its lower end. The shaft 21 is mounted within the bearing sleeve 24, having bearings 25 and 26 for the shaft 21, said bearing sleeve 24 being supported on a flexible metallic diaphragm 27 by means of bolts 28. The construction is such that the tub 11 is free to rock about the universal joint 22, but is in torsional engagement with the shaft 21. The bearing sleeve 24 can rock slightly due to the flexible support at 27, thus allowing the shaft 21 to rock slightly about the universal joint 23, but tending to maintain the shaft 21 in a substantially vertical position. The lower half of the universal joint 23 is connected to the clutch disc 31b, so that the main weight of the tub 11 rests on the clutch members, hereinafter to be described. This construction causes the tub 11 to be self-balancing, when the clothes are placed therein; and when the tub is rotated. In order to enhance and improve the self-balancing of the tub, a centrifugal annular weight 29 is mounted on the lower portion of the tub 11 by means of the disc 30 secured to the center of tub 11.

The rotating and oscillating mechanism 12 is drivingly connected to the shaft 21 through the medium of universal joint 23. Preferably this mechanism includes an oscillating drive clutch 31 and a rotating drive clutch 32. The lower member 32a of the rotating clutch, is continuously rotated by a worm drive gear 33 through the medium of the sleeve 34. The upper member 32b of the rotating clutch, comes into engagement with the lower member 32a when the clutch member 32a is raised along with sleeve 34 and gear 33 by upward movement of collar 36 under the control of the oscillation rotation control solenoid 37 (or under the control of a manual shifting lever where automatic controls are not desired), which is connected to the collar 36 by means of the crank 38 pivoted at 39. The clutch member 32a is raised against 32b a sufficient amount to disengage clutch oscillating clutch 31, thus establishing a rotating drive from the tub 11, shaft 21, clutch 32, sleeve 34 and gear 33, which in turn is rotationally driven by worm 40 on motor shaft 41.

Oscillation of the tub 11 is performed by lowering the clutch 32a and allowing the members of clutch 31 to come into engagement with each other. The lower clutch member 31a of clutch 31 is a cone-shaped member and rides on the thrust bearings 42, which are in turn supported by the spider 43 having radial arms 44 connected to the casing of mechanism 12. The clutch member 31a is given an oscillating movement by means of a reciprocating connecting rod 45, which in turn is driven by the gear 46 meshing with the worm drive 47 on the motor shaft 41 of motor 48. The upper clutch members 31b and 32b are both mounted on the spider 49, which is secured to sleeve 50, the upper part of which is secured to, and forms a support for the universal joint 23.

Consequently when the collar 36 is raised, the tub 11 is rotated, and when the collar 36 is lowered the tub 11 is reciprocated, since upward movement of the collar 36 brings into engagement the rotating clutch 32, and the lowering of collar 36 brings into engagement the reciprocating clutch 31.

The sleeve 50 surrounds the upper portion 51 of the shaft 52, which shaft extends to the lower bearing 53 of the casing 12. The shaft 52 provides an aligning inner bearing for the various rotating parts, and maintains this alignment through the medium of sleeve 50 and universal joint 23.

*Liquid flow conduits and controls*

Various conduits and controls are provided, so that by placing the clothes in tub 11, closing the lid 16, filling reservoir 13 with a soap solution, and reservoirs 14 and 15 with first and second rinse waters, a sequence of operations is started, which automatically washes the clothes in the soap solution, centrifuges the same, agitates the clothes in the first rinse water, centrifuges the same, agitates the clothes in the second rinse water and centrifuges them for the last time. If desired, the soap solution after its respective centrifuging action, can be returned to the reservoir 13 for use with a subsequent batch of clothes, and the second rinse water can be discharged into reservoir 14 after its respective centrifuging operation, so that it can be used as the first rinse for the next subsequent batch of clothes. Reservoir 15 is then filled with a fresh supply of rinse water to form the second rinse for such next subsequent batch of clothes.

The liquid flow connections are diagrammatically shown in Fig. 25, the electrical connections for accomplishing the various operations are shown in Fig. 22, and a time sheet for the operations is shown in Fig. 23. Various mechanisms which are used in accomplishing the control of the fluids and mechanisms are shown in other figures as will be more fully apparent.

Referring now to Fig. 25, a pump 60 has a suction pipe 61 and a discharge pipe 62 so connected that it can withdraw liquid from any one of the reservoirs 13, 14 and 15 and discharge such liquid either into the tub 11 or into the sewer connection 63. This is accomplished by providing suction branches 64, 65 and 66 with solenoid valves 67, 68 and 69, (of the character shown in Fig. 19) and by providing discharge pipe 62 with a solenoid valve 70 (of the character shown in Fig. 20) having a branch 71 leading to the sewer connection 63 and a branch 72 leading to the tub 11. The drain trough 17, adjacent the tub 11, is provided with a discharge pipe 73 leading to a solenoid valve 74 (of the character shown in Fig. 20) which normally discharges into the reservoir 13 through the pipe 75, but, when energized, discharges into the reservoir 14 through the pipe 76. The reservoirs 13, 14 and 15 are provided with overflow openings 77, 78 and 79 all connected to the overflow pipe 80 leading to the sewer connection 63. The above connections, the pump 60, and the various clutches are controlled electrically, so that, at proper times, the pump 60 first withdraws the soap solution from the reservoir 13, through suction branch 66 and suction pipe 61, and discharges the same into tub 11 through pipe 72. Tub 11 is oscillated for the necessary washing period, after which it is centrifugally rotated to discharge the soap solution into trough 17 and through pipes 73 and 75 back into reservoir 13. Thereafter, the pump 60 withdraws the first rinse water from reservoir 14, through the proper connections, and discharges this water into tub 11 while the tub 11 is oscillated for the proper period to thoroughly rinse the clothes in the first rinse water. Thereafter the tub 11 is centrifugally rotated, discharging the first rinse water into the trough 17 and back to the reservoir 14. While this last centrifugal operation is going on, the pump 60 withdraws the rinse water from the reservoir 14 as fast as it is discharged into reservoir 14 from tub 11, and discharges it to the sewer connection 63 thus, in effect, causing the first rinse water to be discharged into the sewer from the tub 11. The tub action is then changed to oscillation, and the pump 60 withdraws the second rinse water from the reservoir 15 and discharges the same into the tub 11 where the clothes are agitated by the oscillating movement of the tub in the second rinse water for a proper washing period. Thereafter the tub 11 is whirled to discharge the second rinse water into the trough 17 and from thence into the reservoir 14 where it remains to be used as the first rinse water for the next subsequent batch of clothes.

The foregoing operations are performed by proper relay controls initiated mainly by the control mechanism shown in Fig. 7, which, by proper cam operations, closes the proper switches to energize the necessary solenoid valves, solenoid clutches, etc.

The main motor 48 is drivingly connected, by means of belt 80, with a pulley 81 forming a part of the control mechanism shown in Fig. 7. The pulley 81, by proper gear reduction mechanism in box 82, drives the cone-shaped gear 83 at a reduced rate. The gear 83 is engageably and disengageably connected to the internal gear wheel 84 to drive the shaft 85 at a slow speed. The shaft 85 is longitudinally movable by the handle 86, through the crank 87 to bring into engagement or disengagement the gears 83 and 84. When the gears are disengaged by movement of handle 86, the shaft 85 can be positioned at any initial starting adjustment by means of the positioning knob 88 for initiating the washing cycle.

The first manipulation of the knob 88 is such as to set the drive crank 90 a proper angular distance from the driven pin 91. This permits the drive shaft 85 to be rotated a selected period of time before the members 90 and 91 come into driving engagement. The time that shaft 85 rotates before the members 90 and 91 engage each other is the period A during which the tub 11 is filled with soap solution and the period B during which the clothes are agitated in the soap solution. This period B is adjustably selectable to provide a variable wash period, of a length desired by the user, during which the clothes are agitated in the soap solution. After the members 90 and 91 come into engagement, the shaft 85a is rotated, and the remaining washing operations C to I are controlled by the cams 92 to 97 inclusive, which are mounted on shaft 85a, as will be hereinafter more fully described. The initial tub filling period A, during which the pump withdraws soap solution from reservoir 13 and discharges it into the tub 11 is performed by cam 101, after which the variable soap wash period B is determined by the original setting of the distance between members 90 and 91.

Figure 6:
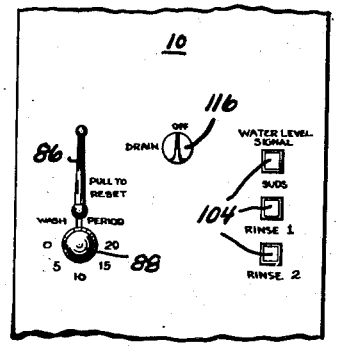
Fig. 6 is a front view of a portion of the outer casing.

Fig. 22 shows the action of the various cams. After the clothes have been placed in the tub 11, the cover 16 is closed and the soap solution and rinses are placed in reservoirs 13, 14 and 15. The handle 98 of the cover is turned to cause the cam 99, which is on the handle shaft, to turn to lock the cover 16 under the edge of the rim 100 of the casing of the machine to lock the cover in place and at the same time close the contacts of the master switch 102. Switch 102 is a master switch which permits the energization of the various units only as long as the cover is locked in closed position. The reservoirs 13, 14 and 15 are provided with float switches 103, of the character shown in Fig. 24, which close their respective contacts, and illuminate the signals 104 when the respective reservoirs are properly filled. These reservoirs are filled by filling pipes 13a, 14a and 15a under manual control. The handle 86 is then moved outwardly to disengage the gears 83 and 84 and the knob 88 is turned to the proper index (see Fig. 6) to provide the desired washing period B. The handle 86 is then released, so that the spring 105 moves the shaft 85 to the left and engages the gears 83 and 84. The cam 101 is provided with a following switch 106, carried by a movable arm 107, so that when the shaft 85 is initially positioned at its selected position the contacts 108 of the switch 106 are closed and remain closed a sufficient length of time to pump the soap solution from the reservoir 13 into the tub 11. The closing of contacts 108 energizes the pump clutch 112 and the soap solution valve 69 to cause the pumping operation. The contacts 108 remain closed a sufficient length of time to permit all of the liquid to be transferred from the reservoir 13 into the tub 11. During all this time the tub 11 is being oscillated, since the solenoid 37 is unenergized, and when it is so unenergized the tub drive is in the oscillating position. The tub 11 continues to be oscillated for the selected wash period of time B, determined by the initial setting of the angular distance between the members 90 and 91. Contacts 108 open after a fixed period of time A and before the members 90 and 91 come into engagement.

After the members 90 and 91 come into engagement, the shaft 85a begins to rotate and the cam 92 moves to close contacts 109, as indicated by the time sheet of Fig. 23 period C. The closing of the contacts 109 energizes the solenoid 37 and thus changes the tub drive from oscillation to spinning and causes the clothes to be centrifuged for a suitable period of time, as long as the corresponding knob and cam 92 keeps the switch 109 closed. The soap solution, during this centrifuging period is discharged into the trough 17 and from thence flows through the pipe 73 and valve 74 back into the reservoir 13. The valve 74 is of the character shown in Fig. 20, and, when unenergized, causes liquid to flow into the pipe 75 rather than into the pipe 76.

The next operation D takes place, as indicated by Fig. 23, when cams 95 and 96 close their respective switches 110 and 111. The closing of switch 110 energizes the pump solenoid 112, which, by the means of lever 113 engages the pump clutch 114 and drives the pump 60. At the same time the closing of the switch 111 energizes the solenoid valve 68 of the reservoir 14 and causes the pump 60 to pump the first rinse water from reservoir 14 into tub 11. At this time, the cam 92 has opened the switch 109 and thus the tub is being oscillated, so that the first rinse water remains in the tub 11 and is agitated with the clothes for the selected period of time D and E during and after the pump operation.

After the clothes have been properly agitated during period E, the cams 92, 93, 94, 95 and 96 close their respective contacts 109, 212, 113, 110 and 111 during period F to cause the first rinse water to be discharged from tub 11 into sewer connection 63. The closing of switch 109 causes the tub to spin. The closing of switch 212 energizes solenoid valve 74, so that the rinse water being centrifuged flows through pipes 73 and 76, into the reservoir 14. The closing of the contacts 113 energizes the solenoid valve 70, so that the discharge from the pump, and from reservoir 14, are directed to the sewer connection 63 to pipe 71. The closing of switch 110 energizes the pump clutch, and the closing of switch 111 energizes valve 68, so that the pump 60 can remove the soiled first rinse water as fast as it is returned to reservoir 14 and can discharge it to the sewer 63.

Thereafter operation G takes place during which the second rinse is pumped from reservoir 15 into tub 11, which is oscillated during the period. Cam 95 keeps the switch 110 closed, and the cam 87 closes the contacts 114. Since the contacts 110 remain closed, the pump continues to operate, and the closing of contacts 114 energizes the solenoid valve 67 and causes the pump 60 to pump the second rinse water from reservoir 15 into the tub 11. The tub is oscillated during this period, since cam 92 has opened its contacts.

During period H the clothes are agitated in the second rinse water. During this period all pumping operations are stopped and the tube is caused to oscillate for the proper length of time.

Thereafter, during period I, the final centrifugal spinning action takes place and the second rinse water is directed into reservoir 14 for use with the next subsequent batch of clothes because cams 92 and 93 close their respective contacts 109 and 112 to spin the tub and to energize valve 74 and direct the extracted rinse water into reservoir 14.

The continued rotation of the control device brings the arm 91 into engagement with the switch 115 (Fig. 9) to open its contacts. The opening of contacts 115 stops the motor 48 and stops all operations, so that the washed and dried clothes can be removed from the tub 11 during the indefinitely long period of time J during which all washing operations are stopped. The next subsequent batch of clothes can be inserted in tub 11 during this period J. The reservoir 15 can be refilled with rinse water, the control reset, and washing operations can be repeated on the next batch of clothes as previously described.

When it is desired to empty the machine of all liquids, the drain switch 116 is turned to the drain position. The turning of this switch (indicated by dotted line 116 in Fig. 22) closes contact 117, 117a and 118 to 122. The closing of switch 117 energizes motor 48 and valve 69. The closing of switches 118 to 121 energizes valve 70, pump clutch solenoid 112, and valves 67 and 68 respectively. The closing of contacts 117a energizes motor 48 and the closing of contacts 122 causes the tub 11 to spin. The tub 11, before the switch 116 is manipulated can be scrubbed with water which remains in the tub until the cover 16 is closed and switch 116 is manipulated. As the tub 11 then spins, the water in the tub is centrifugally discharged into reservoir 13 and from thence into the sewer connection.

If it is thus desired to empty all reservoirs at the same time with the single pump 60 above the level of the reservoirs, a suitable float valve can be provided at the intakes of each of the reservoirs 13, 14 and 15, the float valve being shown in Fig. 26. These float valves slide into place when their respective reservoirs become empty and close their respective pump suction lines, so that the pump can empty any reservoirs still containing liquid.

It is to be understood that, if desired, the pump 60 can be placed below the reservoirs 13, 14 and 15, as indicated in dotted lines in Fig. 25; and then the float valves can be omitted. The relative position of these parts can be changed. The reservoirs 13, 14 and 15 need not be placed inside the casing 10, but may be on the outside of the casing and the automatic operation still may be maintained.

Figure 8:
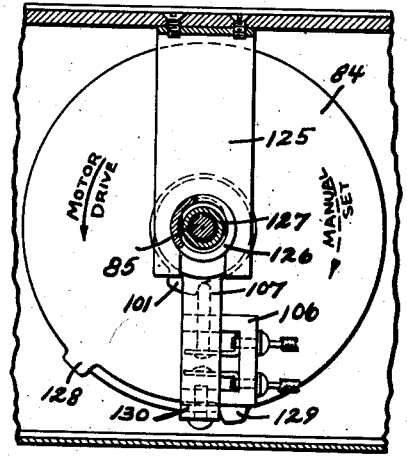
Fig. 8 is a cross-section taken along the lines 8—8 of Fig. 7.

The mechanism which causes the switch 106 to follow properly the cam 101 is provided. The arm 107 is frictionally held in any position by hub 124. The hub 124 is pulled against support 125 by spring 126 and sleeve 127, so that arm 107 tends to remain wherever last positioned. The gear wheel 84 has two lugs 128 and 129 which straddle the lower portion 130 of arm 107. When gear wheel 84 is turned clockwise, (Fig. 8) as indicated by the dotted arrow on the right, lug 129 carries arm 107 with it in a clockwise direction, so that when operation is started and gear wheel 84 is started counterclockwise by motor operation, cam 101 closes switch 106 for the necessary period of time to pump the soap solution from reservoir 13 to tub 11. The switch 106, and arm 107, remain frictionally in the same place until the knob of cam 101 has passed and opened the switch 106 to terminate the pumping action. Thereafter the lug 128 moves the arm 107 counterclockwise to be ready to be again set by lug 129 when the machine is reset. During the resetting operation the cam 101 is moved to the right by the movement of handle 86, (Fig. 7) so that the cam 101 does not enegage switch 106 during the resetting operation.

Figure 9:
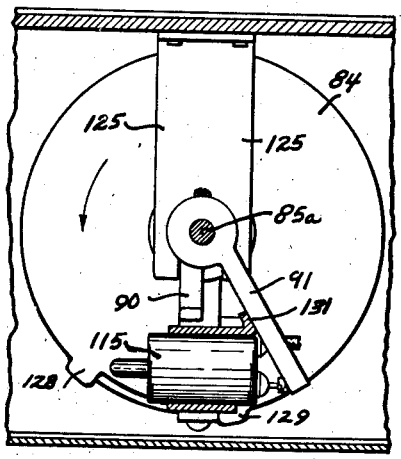
Fig. 9 is a cross-section taken along the line 9—9 of Fig. 7.

The shaft 85a constantly is under a clockwise (as viewed in Fig. 9) turning impulse under the action of spring 130, so that it moves from the position shown in Fig. 9 only when turned by drive crank 90. When the control mechanism is reset by the user, the shaft 85a is returned to the Fig. 9 position by spring 130 and is held with pin 91 against stop 131 until drive crank 90 again comes in contact with pin 91.

Figure 1:
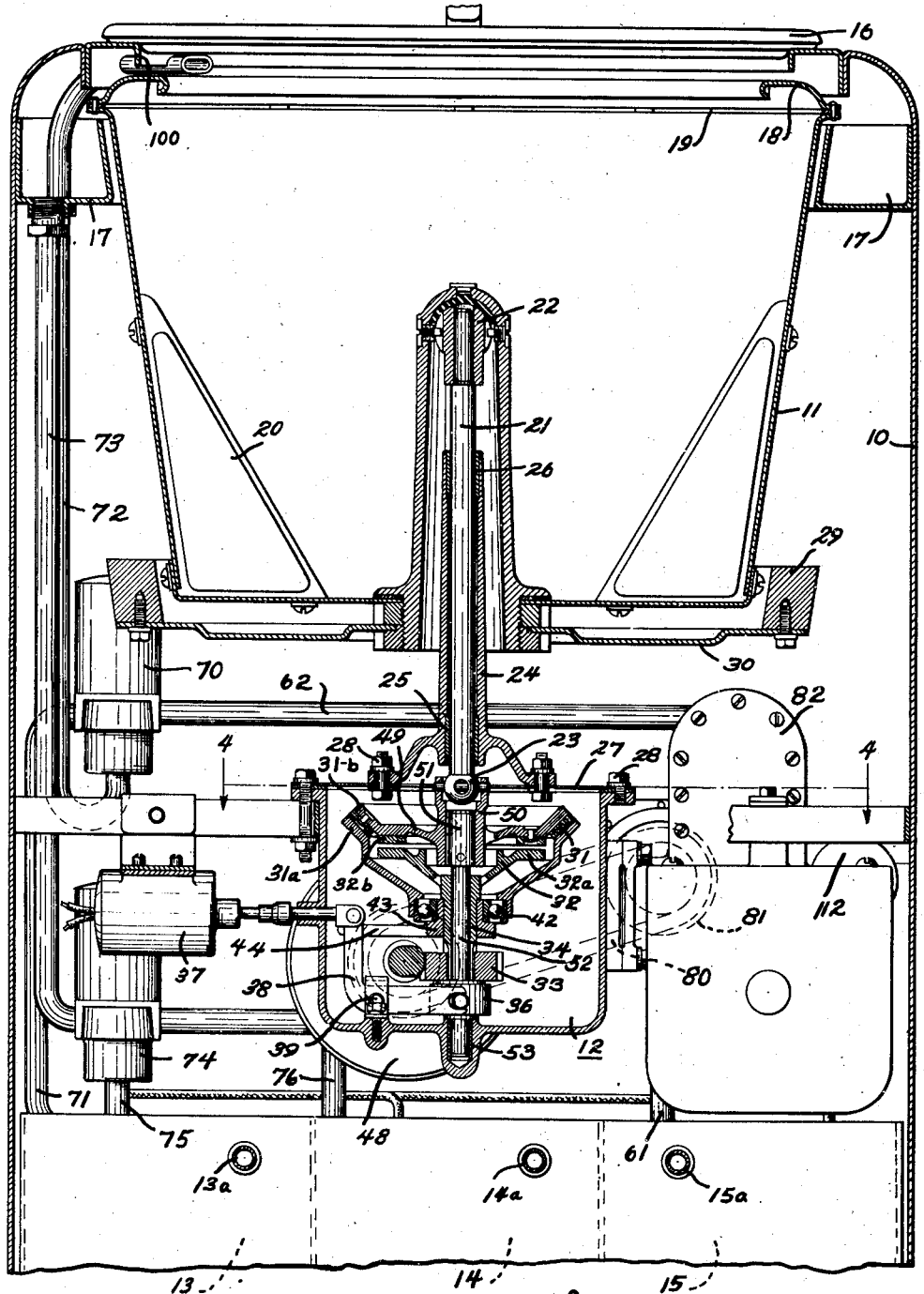
Fig. 1 is a vertical cross-section of the upper portion of my improved washing machine taken along the lines 1—1 of Fig. 4.
Figure 2:
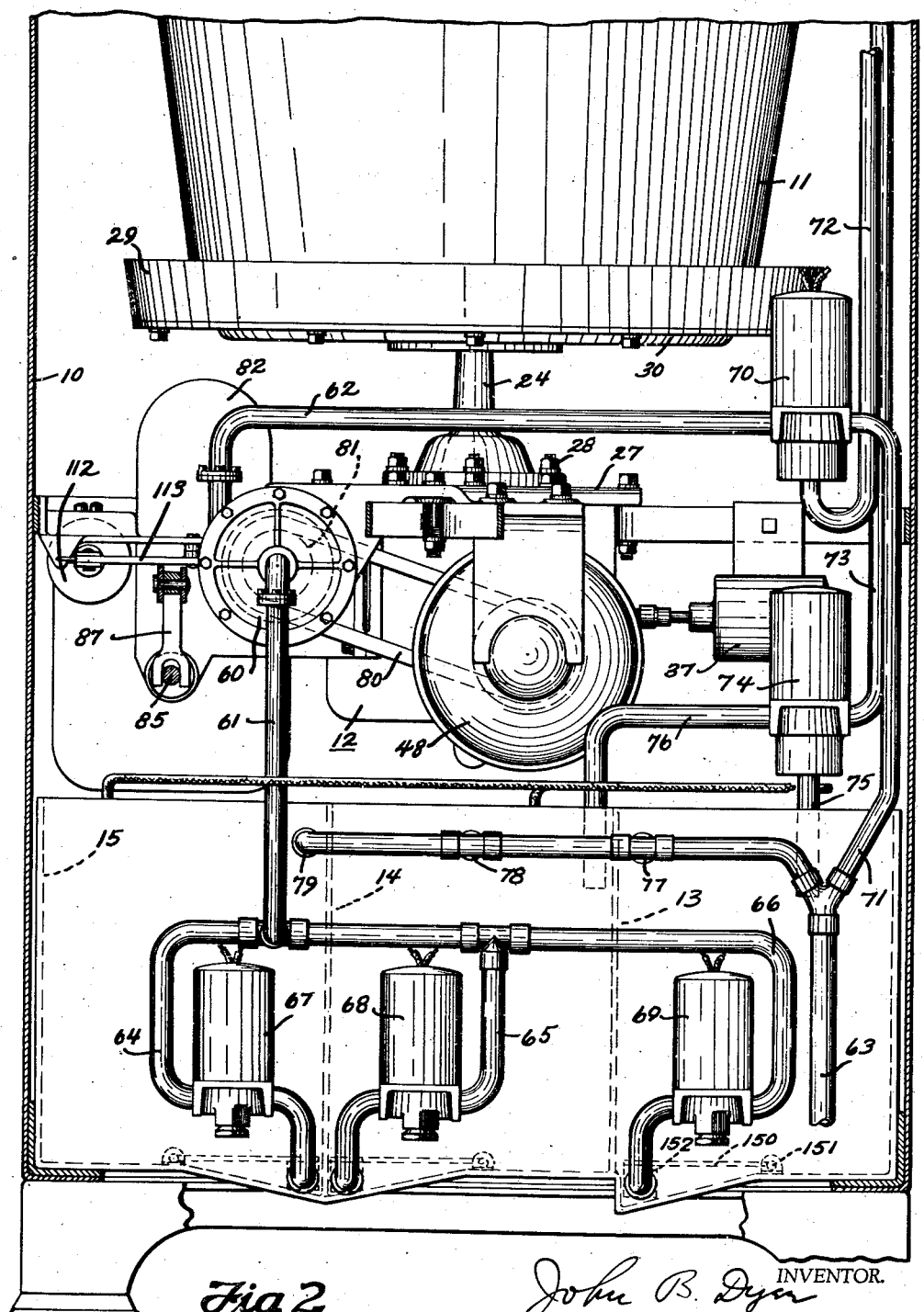
Fig. 2 is another vertical cross-section of the lower portion of my improved washing machine and taken from the side opposite Fig. 1.
Figure 3:
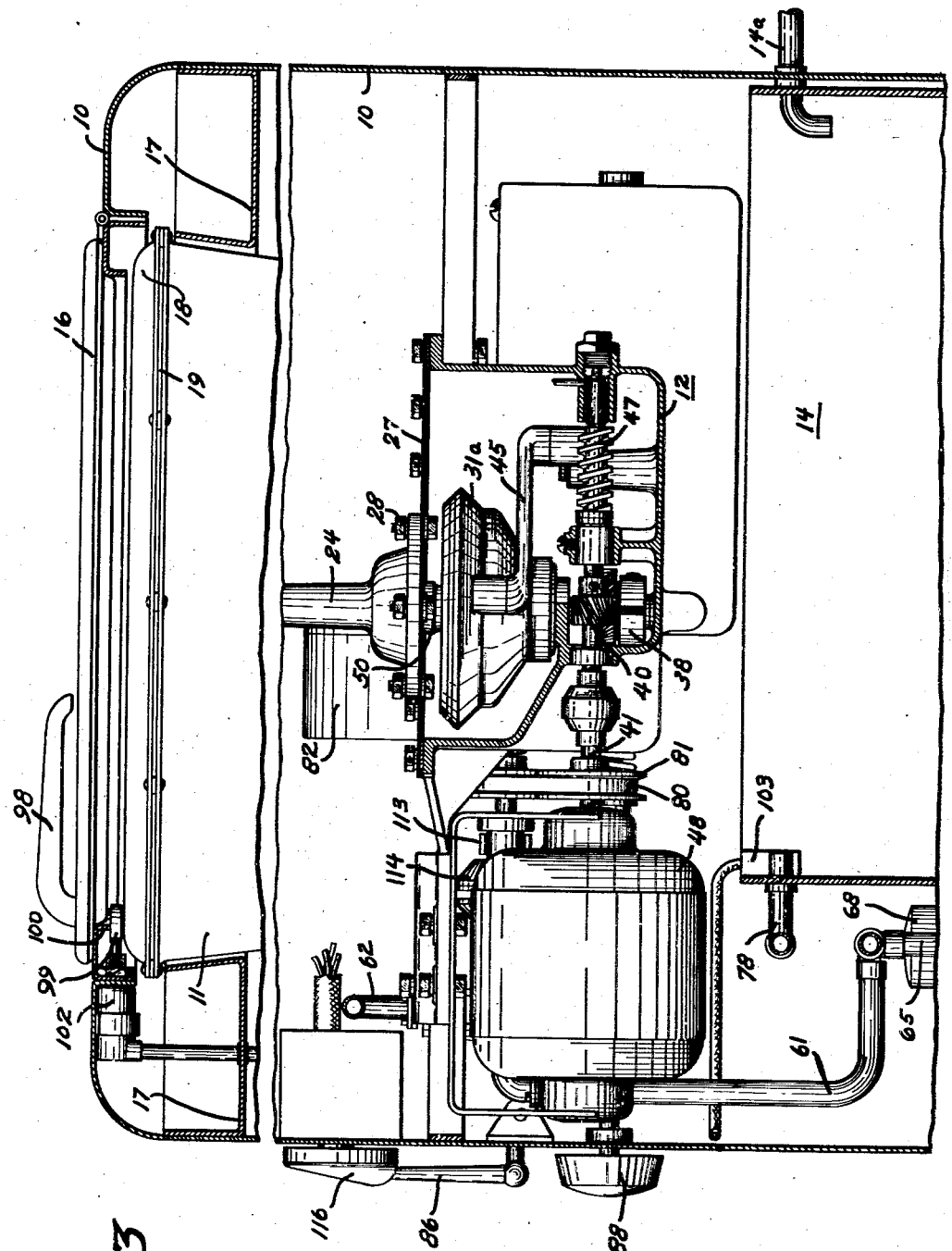
Fig. 3 is a vertical cross-section, taken transversely to Figs. 1 and 2 and along line 3—3 in Fig. 4.
Figure 4:
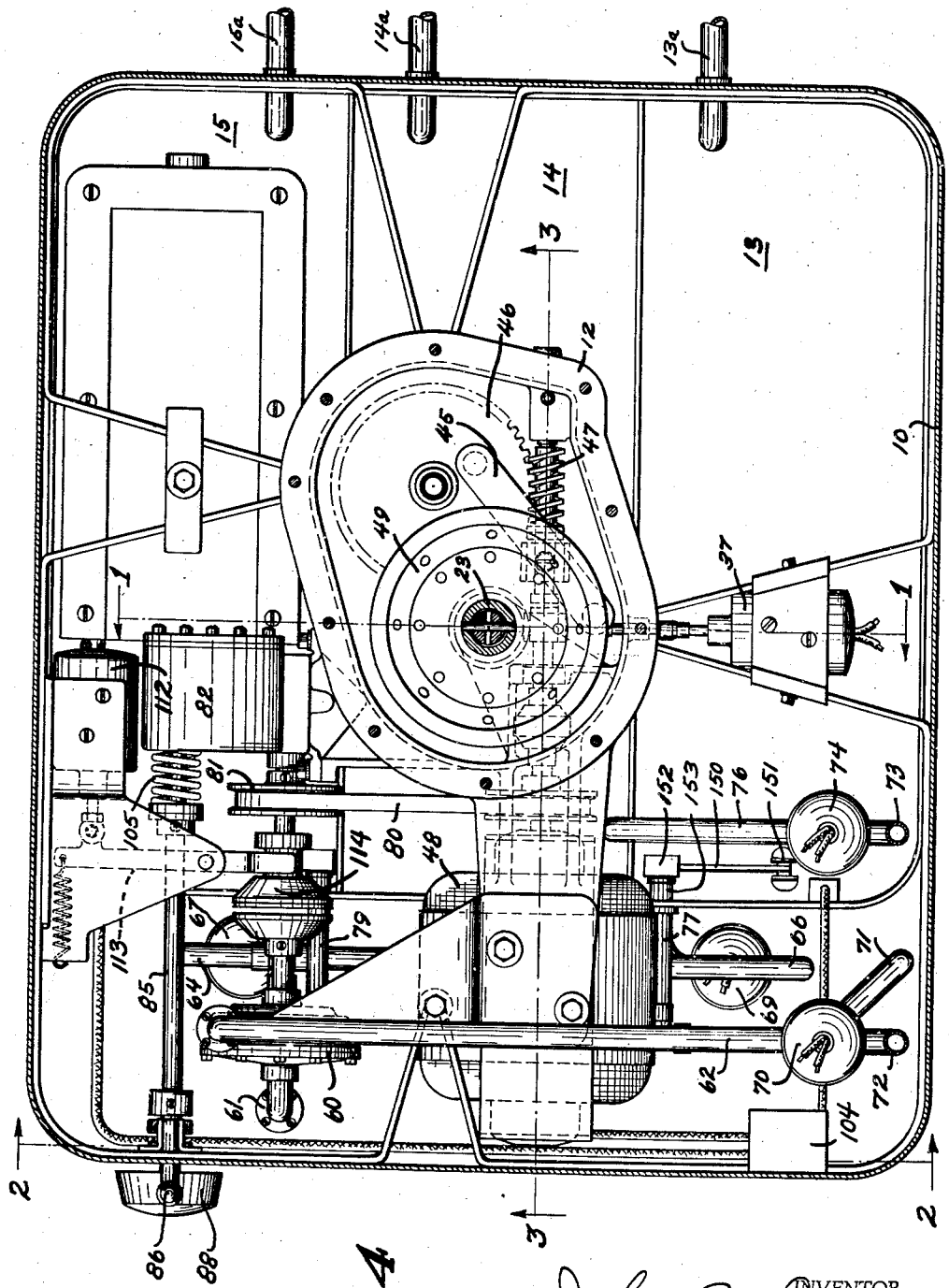
Fig. 4 is a horizontal cross-section taken along the line 4—4 of Fig. 1.
Figure 10:
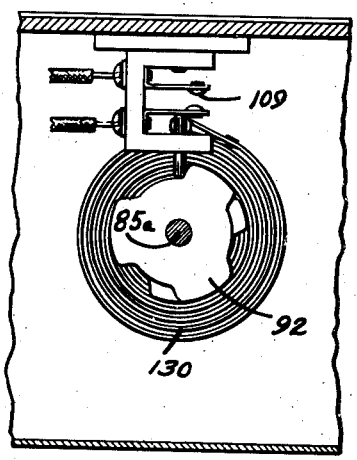
Fig. 10 is a cross-section taken along the line 10—10 of Fig. 7.

The float valves placed at the intakes of the pump 60 may be of any desired construction. As indicated in Figs. 2, 4 and 26, the valves may include an arm 150, pivoted at 151. The arm 150 carries a float 152 which slides over the end 153 of the pump intake and seals the same. By this construction, the pump 60 can withdraw liquid from all three reservoirs 13, 14 and 15 as long as they all contain liquid. As any one or more of these reservoirs become empty, the respective float valve 152 slides over the intake end 153 and seals the intake. This prevents air from entering the pump suction pipes and permits the pump to withdraw liquid from the remaining reservoirs which are not yet empty.

While the form of embodiment of the invention as herein disclosed, constitutes a preferred form, it is to be understood that other forms might be adopted, all coming within the scope of the claims which follow.

What is claimed is as follows:

1. A washing machine comprising a vertically disposed tub, an upwardly directed recess in the bottom of said tub, a supporting vertical drive shaft having a universal joint with said tub in the upper part of said recess, a supporting universal joint at the lower end of said drive shaft, driven clutch means connected to said last named universal joint in tub supporting relationship, and a rotating clutch member and an oscillating clutch member selectively engageable with said driven clutch means, selectively to impart a rotating or an oscillating movement to said tub, and to support the weight of said tub when in engagement with said driven clutch means.

2. A washing machine comprising a vertically disposed tub, means selectively to rotate or oscillate said tube including driven clutch means connected to said tub and forming the main support for said tub, a rotating driving clutch member having a vertically disposed axis, an oscillating driving clutch member having a vertically disposed axis, and means selectively to engage either of said driving clutch members with the lower part of said driven clutch means to form the main support for said tub and driven clutch means by a relative axial movement of said driving clutch members.

3. A washing machine comprising a motor relatively rigidly supported in a frame, a rotating driving clutch member and an oscillating driving clutch member relatively rigidly mounted on said frame and drivingly connected to said motor, a tub having a vertical axis of rotation and freely suported with respect to said frame, a vertically disposed drive shaft having a universal joint connection at its upper end with said tub and a universal joint supporting connection at its lower end, driven clutch means connected with said last named universal joint in tub supporting relationship, and means selectively to engage either of said driving clutch members with said driven clutch means, said driving clutch members having vertical axes of rotation and being movable into engagment with said driven clutch means alternately to support the weight of said tube through said driven clutch member.

4. A washing machine comprising a vertically disposed tub, a laterally resiliently mounted vertical drive shaft supporting said tub, driven clutch means connected to said shaft, a rotating driving clutch member and an oscillating driving clutch member, one of said driving clutch members being upwardly movable to support said shaft and to engage said driven clutch means and the other of said driving clutch members being in engagement with and supporting said driven clutch means when said first named driving clutch means is not in engagement therewith.

5. A washing machine driving mechanism comprising a tub, a vertical driving shaft for said tub having a substantially universally rockably supported sleeve bearing, said shaft being vertically slidable in said bearing, a universal joint at the lower end of said shaft substantially concentric with the rocking center of said bearing, a driven clutch drivingly connected to said shaft through said universal joint, a rotating driving clutch and an oscillating driving clutch below said driven clutch, one of said driving clutches normally supporting said driven clutch in normal engagement and the other of said driving clutches being vertically movable to lift said driven clutch from said normal engagement and into engagement with said last named driving clutch.

JOHN B. DYER.